US010240932B2

(12) United States Patent
Friedler et al.

(10) Patent No.: US 10,240,932 B2
(45) Date of Patent: Mar. 26, 2019

(54) POSITION INDICATION CONTROLS FOR DEVICE LOCATIONS

(71) Applicant: Google LLC, Mountain View, CA (US)

(72) Inventors: Sorelle Alaina Friedler, Haverford, PA (US); Mohammed Waleed Kadous, Santa Clara, CA (US); Andrew Lookingbill, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/491,304

(22) Filed: Apr. 19, 2017

(65) Prior Publication Data
US 2017/0322032 A1    Nov. 9, 2017

Related U.S. Application Data

(63) Continuation of application No. 14/831,140, filed on Aug. 20, 2015, now Pat. No. 9,766,078, which is a
(Continued)

(51) Int. Cl.
*G01C 21/20* (2006.01)
*G01S 5/02* (2010.01)
(Continued)

(52) U.S. Cl.
CPC .......... *G01C 21/206* (2013.01); *G01C 21/20* (2013.01); *G01C 21/367* (2013.01);
(Continued)

(58) Field of Classification Search
CPC .... G01C 21/20; G01C 21/206; G01C 21/367; G01S 19/48; G01S 5/0252; G01S 5/0263; H04W 64/00
(Continued)

(56) References Cited

U.S. PATENT DOCUMENTS 7,359,714 B2    4/2008  Parupudi et al.
7,616,156 B2    11/2009 Smith et al.
(Continued)

FOREIGN PATENT DOCUMENTS

CN    1902838 A    1/2007
JP    2005024568 A    1/2005
(Continued)

OTHER PUBLICATIONS

Notification of the Second Office Action for Chinese Patent Application No. 201280047765.X, dated Mar. 9, 2017.
(Continued)

*Primary Examiner* — Atul Trivedi
(74) *Attorney, Agent, or Firm* — Lerner, David, Littenberg, Krumholz & Mentlik, LLP

(57) ABSTRACT

Aspects of the disclosure relate generally to localizing mobile devices. In one example, a first location method associated with a first accuracy value may be used to estimate a location of the mobile device. A confidence circle indicative of a level of confidence in the estimation of the location is calculated. The confidence circle may be displayed on a mobile device. When other location methods become available, the size of the displayed confidence circle may be expanded based on information from an accelerometer of the client device or the accuracy of the other available location methods. This may be especially useful when the mobile device is transitioning between areas which are associated with different location methods that may be more or less accurate.

20 Claims, 9 Drawing Sheets

Related U.S. Application Data continuation of application No. 14/132,740, filed on Dec. 18, 2013, now Pat. No. 9,146,117, which is a continuation of application No. 13/539,646, filed on Jul. 2, 2012, now Pat. No. 8,635,023.

(60) Provisional application No. 61/562,653, filed on Nov. 22, 2011.

(51) Int. Cl.
  G01C 21/36 (2006.01)
  H04W 64/00 (2009.01)
  G01S 19/48 (2010.01)

(52) U.S. Cl.
  CPC .......... *G01S 5/0252* (2013.01); *G01S 5/0263* (2013.01); *H04W 64/00* (2013.01); *G01S 19/48* (2013.01)

(58) Field of Classification Search
  USPC ......................................................... 701/495
  See application file for complete search history.

(56) References Cited

U.S. PATENT DOCUMENTS

| | | | |
|---|---|---|---|
| 7,764,231 B1 | 7/2010 | Karr et al. | |
| 8,519,844 B2 | 8/2013 | Richey et al. | |
| 8,635,023 B2 | 1/2014 | Friedler et al. | |
| 8,825,388 B2 | 9/2014 | Khorashadi et al. | |
| 9,116,000 B2 | 8/2015 | Pakzad et al. | |
| 9,648,460 B2 * | 5/2017 | Harper | G01S 19/03 |
| 2003/0176965 A1 | 9/2003 | Padmanabhan | |
| 2003/0216865 A1 | 11/2003 | Riewe et al. | |
| 2005/0049821 A1 | 3/2005 | Sahinoglu | |
| 2005/0179591 A1 | 8/2005 | Bertoni et al. | |
| 2006/0167627 A1 | 7/2006 | Dooley et al. | |
| 2006/0240840 A1 | 10/2006 | Morgan et al. | |
| 2007/0077941 A1 | 4/2007 | Gonia et al. | |
| 2007/0149216 A1 | 6/2007 | Misikangas | |
| 2007/0178913 A1 * | 8/2007 | Niemenmaa | H04W 64/00 455/456.4 |
| 2007/0184850 A1 | 8/2007 | Hupp et al. | |
| 2007/0202887 A1 | 8/2007 | Counts et al. | |
| 2007/0205373 A1 | 9/2007 | Komblau et al. | |
| 2007/0247366 A1 * | 10/2007 | Smith | G01S 5/021 342/464 |
| 2008/0255758 A1 | 10/2008 | Graham et al. | |
| 2009/0054076 A1 | 2/2009 | Evennou et al. | |
| 2009/0075677 A1 | 3/2009 | Seger et al. | |
| 2009/0082139 A1 | 3/2009 | Hart | |
| 2009/0149200 A1 | 6/2009 | Jayasinghe et al. | |
| 2010/0064373 A1 | 3/2010 | Cai et al. | |
| 2010/0090901 A1 | 4/2010 | Smith et al. | |
| 2010/0217517 A1 | 8/2010 | Oohashi et al. | |
| 2011/0159886 A1 | 6/2011 | Kangas et al. | |
| 2011/0172916 A1 | 7/2011 | Pakzad et al. | |
| 2011/0177831 A1 * | 7/2011 | Huang | G06F 17/3087 455/457 |
| 2011/0177832 A1 | 7/2011 | Huang | |
| 2011/0178705 A1 | 7/2011 | Pakzad et al. | |
| 2011/0215966 A1 | 9/2011 | Kim et al. | |
| 2011/0244887 A1 * | 10/2011 | Dupray | G01C 21/206 455/456.2 |
| 2011/0250903 A1 | 10/2011 | Huang et al. | |
| 2011/0294515 A1 | 12/2011 | Chen et al. | |
| 2011/0300875 A1 | 12/2011 | Kim et al. | |
| 2012/0136623 A1 * | 5/2012 | Edge | G01S 5/0284 702/150 |
| 2012/0143495 A1 | 6/2012 | Dantu | |
| 2012/0184287 A1 | 7/2012 | Jovicic et al. | |
| 2012/0190380 A1 | 7/2012 | Dupray et al. | |
| 2012/0254804 A1 * | 10/2012 | Sheha | G06Q 30/02 715/834 |
| 2012/0290254 A1 | 11/2012 | Thrun et al. | |
| 2012/0308081 A1 | 12/2012 | Sato | |
| 2012/0315918 A1 | 12/2012 | Kadous | |
| 2013/0053056 A1 | 2/2013 | Aggarwal et al. | |
| 2013/0131973 A1 * | 5/2013 | Friedler | G01C 21/20 701/409 |
| 2013/0196682 A1 | 8/2013 | Kristoffersen et al. | |
| 2014/0171098 A1 | 6/2014 | Marti et al. | |
| 2014/0171114 A1 | 6/2014 | Marti et al. | |
| 2014/0278060 A1 | 9/2014 | Kordari et al. | |
| 2015/0133173 A1 | 5/2015 | Edge et al. | |

FOREIGN PATENT DOCUMENTS

| | | |
|---|---|---|
| JP | 2005077160 A | 3/2005 |
| JP | 2010201557 A | 9/2010 |
| JP | 2010210557 A | 9/2010 |
| WO | 2010123418 A1 | 10/2010 |
| WO | 2011143601 A2 | 11/2011 |

OTHER PUBLICATIONS

International Search Report & Written Opinion for Application No. PCT/US2012/065819 dated Mar. 4, 2013.
Japanese Office Action for Application No. 2014-542547 dated Oct. 21, 2014.
Examination Report for European Patent Application No. 12851031.0 dated Feb. 29, 2016.
Notification of First Office Action for Chinese Patent Application No. 201280047765.X, dated Nov. 9, 2016.

* cited by examiner

POSITION INDICATION CONTROLS FOR DEVICE LOCATIONS

CROSS-REFERENCE TO RELATED APPLICATIONS

The present application is a continuation of U.S. patent application Ser. No. 14/831,140, filed Aug. 20, 2015, which is a continuation of U.S. patent application Ser. No. 14/132,740, filed Dec. 18, 2013, which is a continuation of U.S. patent application Ser. No. 13/539,646 filed Jul. 2, 2012 now U.S. Pat. No. 8,635,023, which claims the benefit of the filing date of U.S. Provisional Patent Application No. 61/562,653 filed Nov. 22, 2011, the entire disclosures of which are hereby incorporated herein by reference.

BACKGROUND

The present disclosure relates generally to the field of indoor positioning and location-based information systems, and more specifically to systems and methods for providing an indication of position and position confidence near a structure periphery, such as when located proximate an exterior wall of a structure, when transitioning from an indoor location (i.e., first positioning system) to an outdoor location (i.e., second positioning system), and so on.

Typical location-based information systems depend on the global positioning systems (GPS) to determine a geographic location and a remote database that contains information associated with a particular geographic location. GPS receivers generally rely on navigation signals broadcasted by satellites orbiting the Earth. Such receivers require an essentially unobstructed line of sight to the satellites in order to provide reliable location information. Thus, GPS is typically used to establish locations in outdoor environments only and may not be suitable to indoor locations. Even in outdoor locations, the presence of tall buildings, and other obstructions in the line of sight can preclude GPS positioning. Indoor positioning systems (IPS) have been developed for use within indoor environments, such as office buildings. Such systems generally use various wireless transmissions, for example, infrared (IR) or ultrasound signals, for location and tracking purposes. Devices have also been configured to utilize other data sources, such as WiFi signals, Bluetooth, on-board compass and accelerometer (and/or gyroscope, magnometer, etc.) data, as well as existing floor plans and databases of measurements. Thus, geo-positioning devices are often configured to switch operation between different geo-positioning systems.

Indoor geo-positioning systems have a number of known limitations. For example, many such systems require special sensor/transceiver devices and infrastructure to be deployed with the interior spaces of buildings. Further, many existing systems fail to provide accurate position determinations due to the inherent interference limitations that occur within indoor spaces, and fail to provide any device orientation determinations. Further still, many existing systems require significant power consumption on the part of the mobile device. (For example, a system may require the mobile device to enable its GPS function or continually transmit a signal in order to determine its position.) Still further, certain systems require map or measurement data where none exist (e.g., a building has not been mapped or measured, nor its floor plan uploaded).

In one approach, a map of signal features of a structure is created, such as a grid of points, each point including a list of WiFi access points accessible at that point and the signal strength of each at that point. When determining location within the structure, a mobile device, such as computer-enabled mobile telephone (so-called smart phone), evaluates accessible WiFi access points and signal strengths wherever the device currently is compares that the map. A cluster of "particles" is created, each particle being a possible location of the mobile device. Each particle has associated with it a degree of confidence that the mobile device is at that point. The mean location of the clustered particles is then determined. The particle closest to the mean location is then selected as the location of the client device.

The location of the client device is often indicated by a dot displayed on a map, indicating position. However, it is difficult to accurately determine location at the scale of an indoor location (meter or less), particularly when GPS positioning systems are unavailable. Therefore, the indicated mobile device location is actually an indication of the greatest likelihood of position. In certain applications, a circle with the location dot as its center represents the overall degree of confidence that the indicated location is the current mobile device location. The smaller the radius of the circle, the higher the probability that the client device is located at the indicated dot. Thus, the radius of the circle is related to the confidence level in the indicated client device location. For this reason, the circle is referred to as a confidence circle.

However, when a client device is proximate a boundary between two different positioning systems, the device may experience difficulty determining which system to use for a current position determination and display. For example, when a client device is near the perimeter of a structure, the device may receive positioning data from a relatively higher-precisions indoor system (e.g., WiFi) as well as a relatively lower-precision outdoor system (e.g., cell tower triangulation). This may result in the device arbitrarily switching from one system to another in certain cases showing the device location jumping back and forth between first and second positions (e.g., the dot jumping indoors, then outdoors). For many reasons, the first and second positions may be surprisingly far from one another. In addition, since each positioning system has its own associated accuracy and hence confidence circle, the radius of the confidence circle may vary when switching between systems in this way. Again, for many reasons the radius of the confidence circles at the first and second positions may vary greatly. Therefore, there remains a desire for improvements in the indication of location and confidence the system has in the location (i.e., location of the client device).

SUMMARY

Accordingly, the present disclosure is directed to systems and methods for providing an indication of a position and a level of confidence in that position for a client device, such as displayed on the client device. Where position and confidence in position are indicated on a display, these indications relatively smoothly change state, such as when the client device is at a structure periphery and when the client device transitions between different positioning systems.

According to one aspect of the disclosure the client device is configured to display an indication (e.g., dot) representing its current location, for example in the context of the displayed map of the vicinity of the device. Alternatively, the location of the device may be displayed on a remote device, such as a computer, again superimposed on a map of the vicinity of the device. When a device is near the boundary of one position system, such as an indoor positioning system, delay is introduced into the calculation and display of position so that the device location indication (dot) is more stable. Furthermore, the delay reduces the arbitrary changes in radius of the confidence circle. Ultimately, position indication and the radius of the confidence circle transition more smoothly and accurately.

According to another aspect of the present disclosure, the prior position of the client device is retained for a fixed period of time. If a more accurate location determination can be made during that time, the new position is displayed. If not, the radius of the confidence circle is slowly expanded around the prior position.

According to still another aspect of the present disclosure, a vector that a mobile device is following from a first positioning system to a second positioning system may be used to determine an expect arrival time at the second position system. If no position indication can be obtained using the second positioning system within an expected period of time, the client device will revert to determining position based on time (e.g., from an on-board clock) and/or distance (e.g., from an on-board accelerometer, gyroscope, magnetometer, etc.), using the direction from the vector. The confidence circle will reflect the appropriate level of confidence in this estimation.

The above is a summary of a number of the unique aspects, features, and advantages of the present disclosure. However, this summary is not exhaustive. Thus, these and other aspects, features, and advantages of the present disclosure will become more apparent from the following detailed description and the appended drawings.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION

We initially point out that description of process, components, equipment, and other details known in the art may merely be summarized or are omitted so as not to unnecessarily obscure the details of the present disclosure. Thus, where details are otherwise well known, we leave it to the application of the present disclosure to suggest or dictate choices relating to those details.

Figure 1:
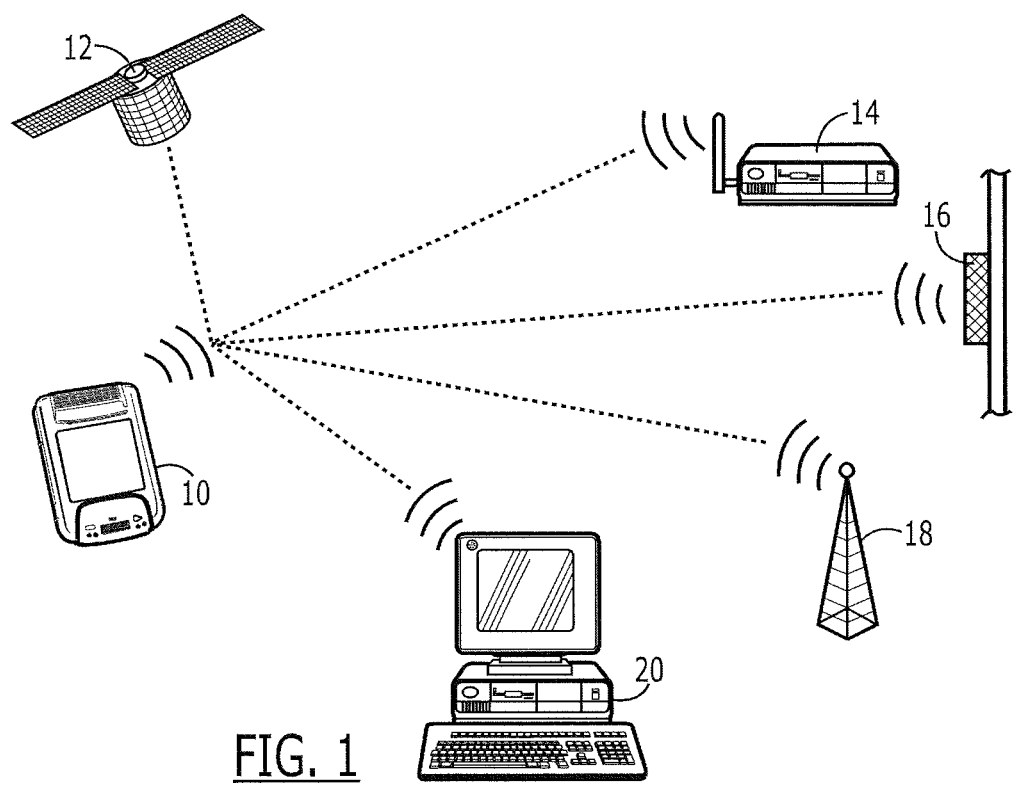
FIG. 1 is an illustration of the a network in which a mobile device may access and utilize geo-positioning data according to the present disclosure.

With reference to FIG. 1, there is illustrated an exemplary environment in which the teachings of the present disclosure may be applied. Typically, the teachings hereof are applied in the context of an application running on a mobile device 10, such as a computationally-enabled mobile telephone (smart phone), tablet computer, or the like. Mobile device 10 is configured to utilize global positioning (GPS) data from a GPS data source 12.

Mobile device 10 is further configured for wireless communication via one or more wireless protocols such as WiFi, Bluetooth, etc. with one or more wireless access points 14. In one example, beacon messages from the one or more wireless access points 14 may be IEEE 802.11 management frames transmitted by access points to announce themselves to potential wireless network users. These frames may contain Service Set Identifiers ("SSID") information as well as physical layer parameters that assist devices in connecting to the wireless network.

Mobile device 10 may further be configured for infrared (IR), ultrasound, or other local, short-range communication, such as with an appropriate base station 16. Mobile device 10 may further still be configured for cellular telephone communication, via one or more cellular transmission "towers". Finally, mobile device 10 may be communicatively connected to a server or other computer system 20, by any of a variety of methods and protocols, such that mobile device 10 may be considered a "client" device.

Figure 2:
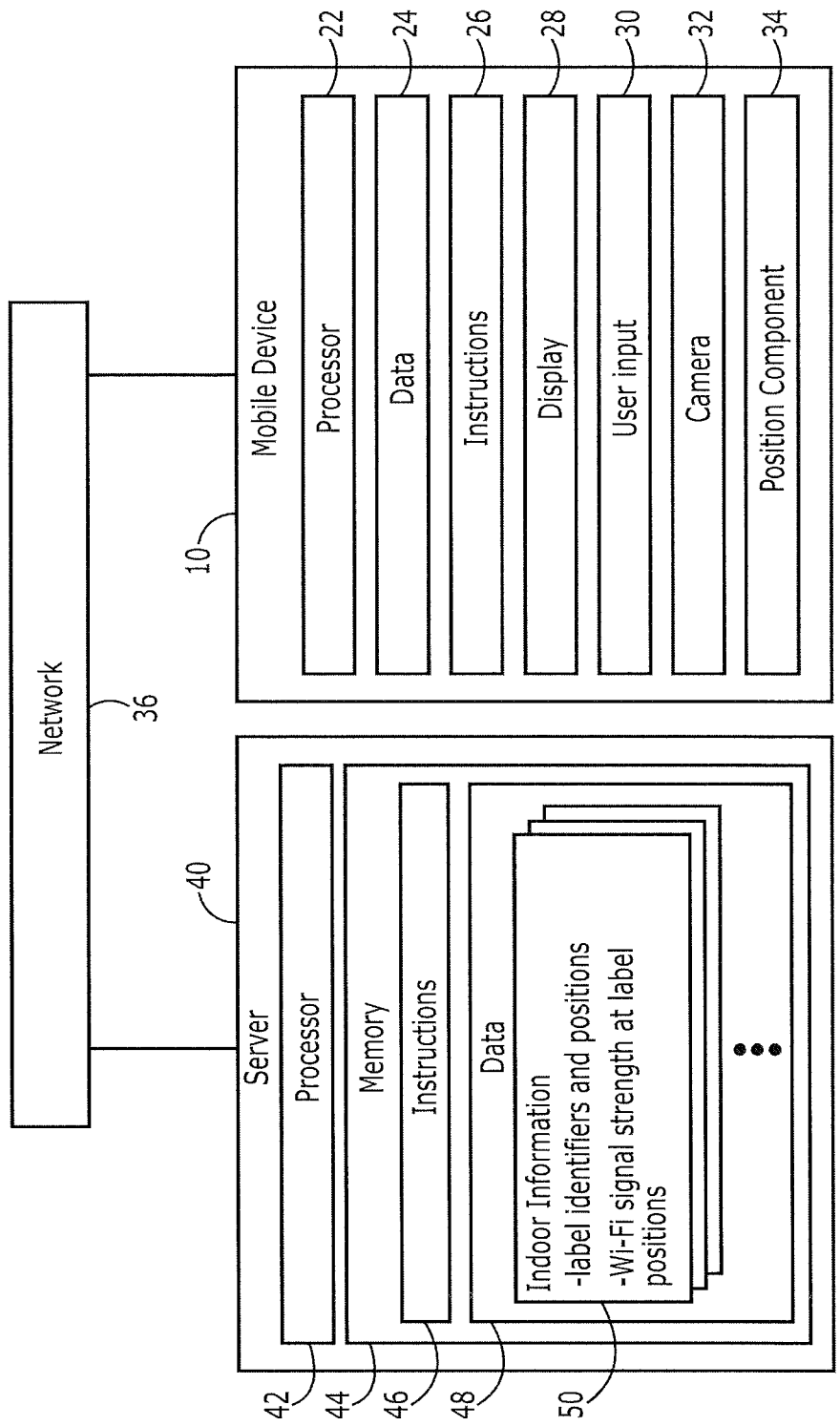
FIG. 2 is an illustration of the architecture of a mobile device in a client-server model in a networked context, according to an embodiment of the present disclosure.

With reference to FIG. 2, mobile device 10 may be configured to include a processor 22, data memory 24, and instructions memory 26. Mobile device 10 may further include an electronic display 28 (e.g., a touch-screen), an input device 30 (e.g., a keyboard, that may be a function performed by a portion of display 28), and a camera 32. Mobile device 10 further includes a position component 34 configured to use various resources to estimate aspects of the position of the device itself, as discussed further below.

In a client-server implementation, mobile device 10 communicates with a server computer 40 via a network 36 for inter alia assistance in determining device location. Network 36 is typically a wireless network. Server 40 typically includes a processor 42 and memory 44 containing instructions 46 controlling operation of server 40 as well as data 48 supporting that operation.

In certain embodiments, mobile device 10 relies on data 50 stored in server 40 to assist with determining its position. For example, server 40 may contain data about a building space in which the mobile device is located, such as label identifiers and associated positions, and WiFi signal strengths at the label positions. GPS or other positioning system operable outside of the building may be used to determine that mobile device 10 is somewhere within the building. However, since GPS cannot function within the building (no line-of-sight to the GPS satellites), GPS cannot be used to accurately determine location within the building. However, by communicating with the server and identifying the labels and WiFi signal strengths in the proximity of mobile device 10, an estimated position of mobile device 10 may be determined, particularly when GPS is not available (i.e., inside the building).

Similar techniques may be employed for position determination in the absence of GPS using Bluetooth signals, IR, ultrasound, image recognition (using the mobile device's on-board camera), and so on. It is assumed for the purposes of the present disclosure that such other techniques are well known, and thus are not discussed in detail herein.

Figure 3:
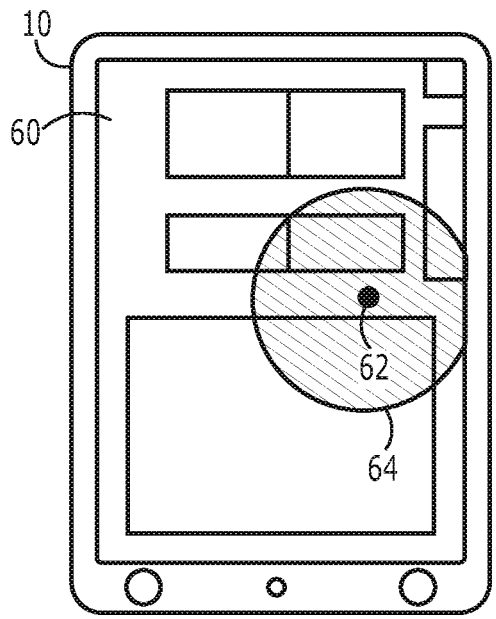
FIG. 3 is an illustration of a mobile device with a geo-positioning indicator rendered on a map of the space at which the mobile device is located, including a confidence circle, according to an embodiment of the present disclosure.

With reference next to FIG. 3, a mobile device 10 is illustrated which displays a partial map 60 of an indoor location in which mobile device 10 is presently located. A location dot 62 is rendered on map 60 representing an estimation of the current location of mobile device 10. As discussed below, the position is merely an estimation, and there is an associated level of confidence in that estimation. The level of confidence is indicated by the confidence circle 64. There is a selected (arbitrary) level of confidence that the actual location of mobile device 10 is within the region circumscribed by confidence circle 64. Thus, a smaller radius of confidence circle 64 indicates a higher degree of confidence that dot 62 represents the actual location of mobile device 10, and conversely a larger radius indicates a lesser degree of confidence.

Figure 4:
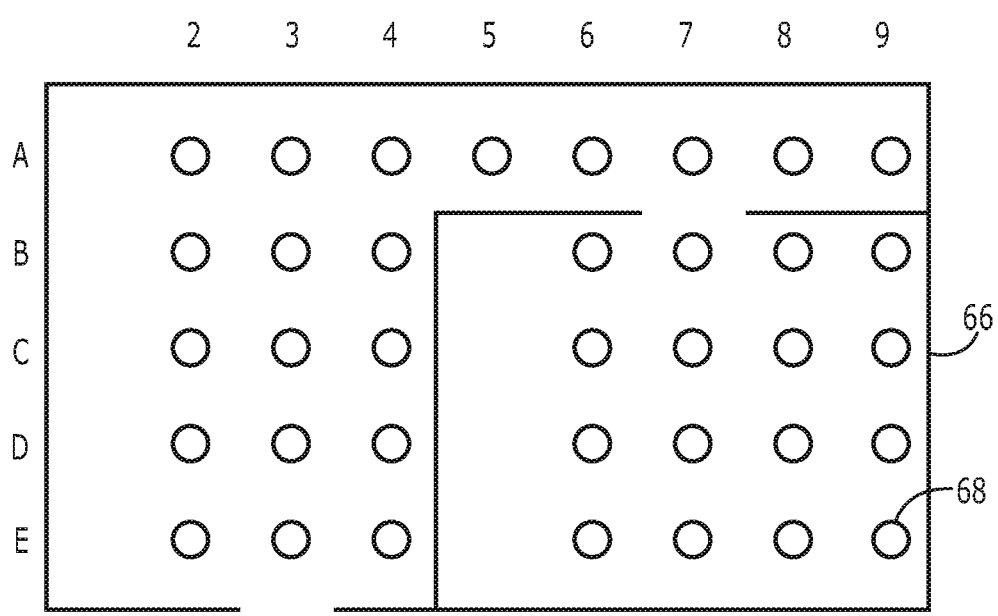
FIG. 4 is a map of a space illustrating a grid of locations for which WiFi or other indoor geo-positioning data has been obtained and mapped to the space, according to an embodiment of the present disclosure.

Calculation of the radius of the confidence circle may be made in a number of different ways. In one embodiment, a map 66 of a space, such as shown in FIG. 4, is populated with particles 68. Particles 68 generally represent locations at which known reference values, such as WiFi signal strengths, from a plurality of sources are known. Thus, one method of positioning involves measuring WiFi signal strengths associated with the sources, and matching the results to map 66. For many reasons, the signal strengths vary over time. Thus, identifying which particle represents the current mobile device location involves determining which particle(s) most likely match the data observed by mobile device 10. Other sensor data from mobile device 10 may be used in conjunction with map analysis to increase the certainty with regard to various possible locations (particles), such as last known direction, steps or time since last location determination, and so on. In addition, particles may be weighted based on their location, established likelihood of being an actual location, and so on.

Figure 5:
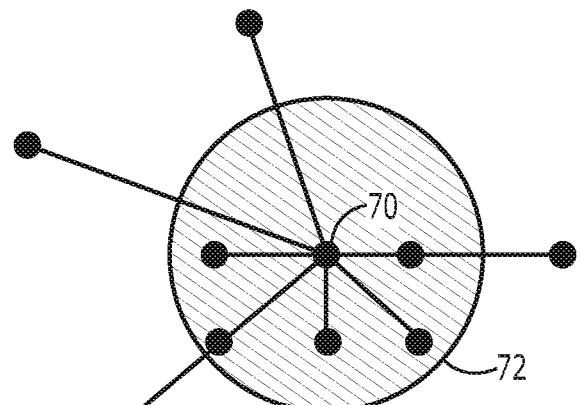
FIG. 5 is an illustration of a number of particles that are candidate positions based on an example of data observed by a mobile device including a confidence circle, according to an embodiment of the present disclosure.

FIG. 5 is an illustration of a number of particles that represent candidate positions based on an example of data observed by mobile device 10. The weighted mean particle is determined, and assigned to be a center point, point 70 in this example. As an alternative to the weighted mean particle, other particles or calculated points may be used as a center or location point, with tradeoffs as will be appreciated. A confidence circle 72 is shown constructed around center point 70. (Typically, only the center point and confidence circle are rendered on a map for a user, but this may not always be the case.) The radius of confidence circle 72 is a communication of the uncertainty that mobile device 10 is actually located at position 70. The radius of confidence circle 72 is determined as two times the standard deviation of the distance each particle is from the given center particle (in this case, the weighted mean particle). More precisely, where $w_i$ is the normalized weight of the $i_{th}$ particle and (x,y) is the location of the weighted mean particle, there are n particles, and $(x_i, y_i)$ is the position of the $i_{th}$ particle $$2\sqrt{\sum_{i=0}^{n} w_i \cdot ((x - x_i)^2 + (y - y_i)^2)}$$

Figure 6:
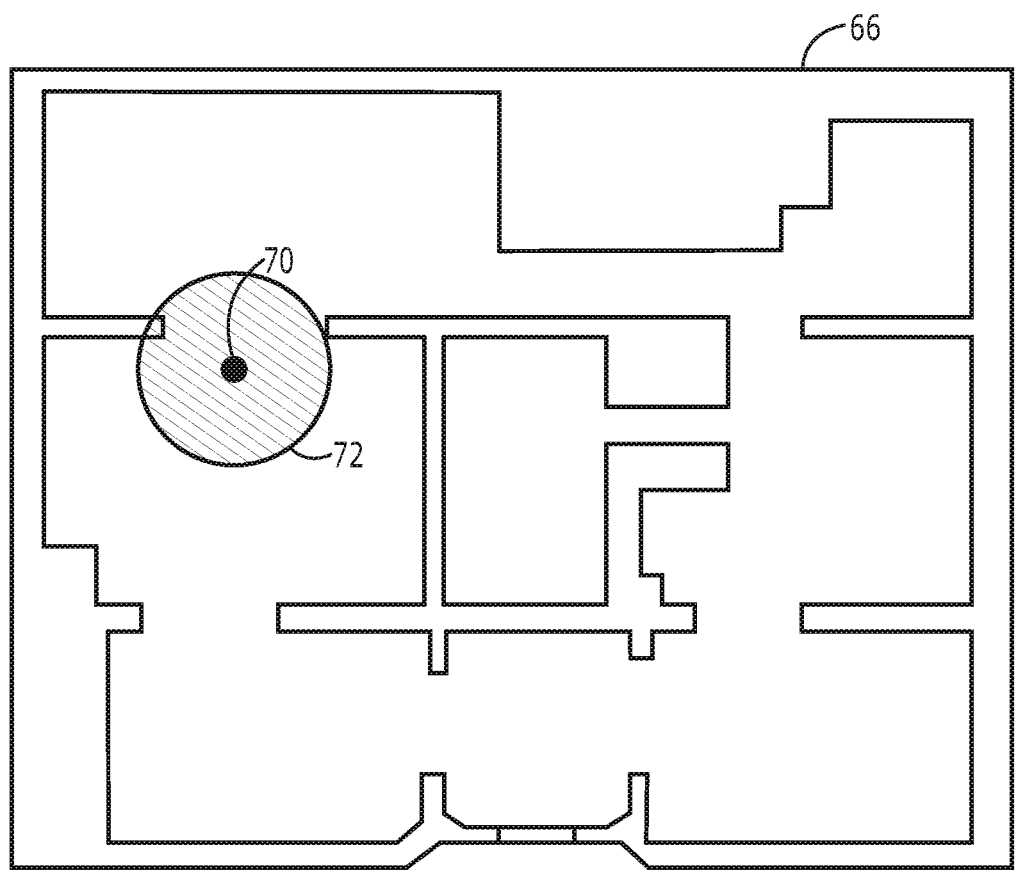
FIG. 6 is an illustration of a mapped space, location indication, and confidence circle within a mapped structure, according to an embodiment of the present disclosure.

Thus, the radius of the confidence circle can change dynamically as the data observed by the mobile device changes. This is true even when the mean particle does not change. For example, the radius of the confidence circle increases when steps are detected, even when the direction of those steps is unknown. In order to provide a visually useful and appealing user interface, the location dot and confidence circle may be present in the context of a map of the structure, such as illustrated in FIG. 6.

Figure 7:
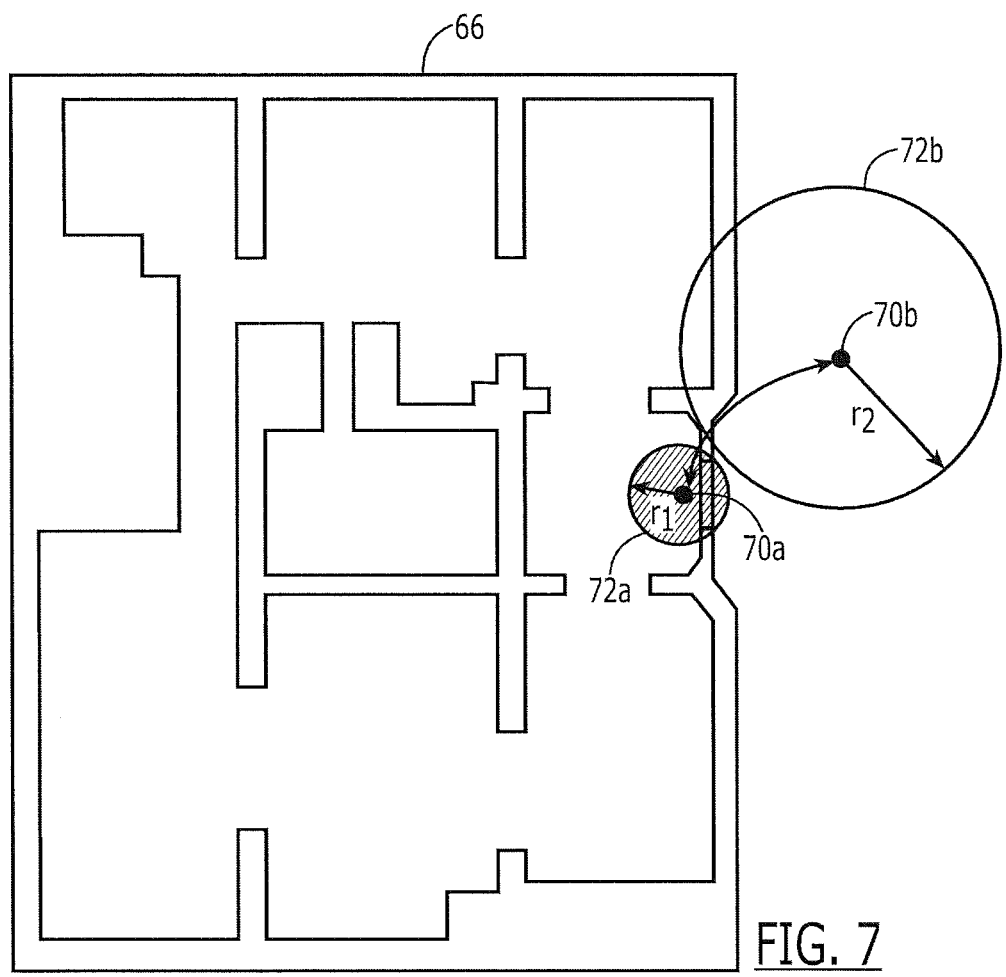
FIG. 7 is an illustration of a mapped space, location indication, and confidence circle proximate an exit of the space, showing a jump discontinuity in position and confidence circle radius.

Providing location and confidence can become problematic when the mobile device moves from a location at which high quality position information is available, for example from a first source or positioning system, to a location at which low quality position information is available, for example from a second, different source or system. Drastic jumps from a high precision position (small confidence circle radius) positions to a low precision position (large confidence circle radius) since the location dot may jump between positions, and the confidence circle may also jump around the center point between large and small radii. This problem may be encountered, for example, when the mobile device is inside but very close to the exterior of a building in which there is a high precision position system but is on the fringe of the coverage of that high precision system and where the immediate exterior vicinity of that building is not well serviced by another high precision system. This can occur in urban cities, where tall structures can block line-of-sight to the GPS satellites (the "urban canyon" effect). In the absence of GPS, mobile devices can rely on cell tower triangulation, but that method is much lower precision than the indoor WiFi positioning system. Another example situation in which this occurs is when the mobile device leaves an indoor location (high precision) and moves outside to a location having poor or no GPS coverage. Still another example situation is where the mobile device leaves a first, surveyed indoor location (high precision) and continues to a second, non-surveyed location (low precision). In these types of cases there is a discontinuity in positioning data precision, causing jumps in estimated location and confidence circle diameter as the positioning data jumps from one system to the other. This is illustrated in FIG. 7, in which the location indication for mobile device 10, located near a doorway on map 66 jumps from dot 70a to dot 70c, and confidence circle jumps from circle 72a of radius r1 to circle 72 of radius r2. This jump can be back and forth between the systems, leading to confusion regarding location and an otherwise undesirable user interface. And, while a jump between two possible positions is shown in FIG. 7, it will be appreciated that the device position may jump between multiple different indicated positions due to the above precision discontinuity. And while shown as a relatively small jump in position and confidence circle radius, it may be that such a jump is much more drastic, both in location and radius.

Figure 8:
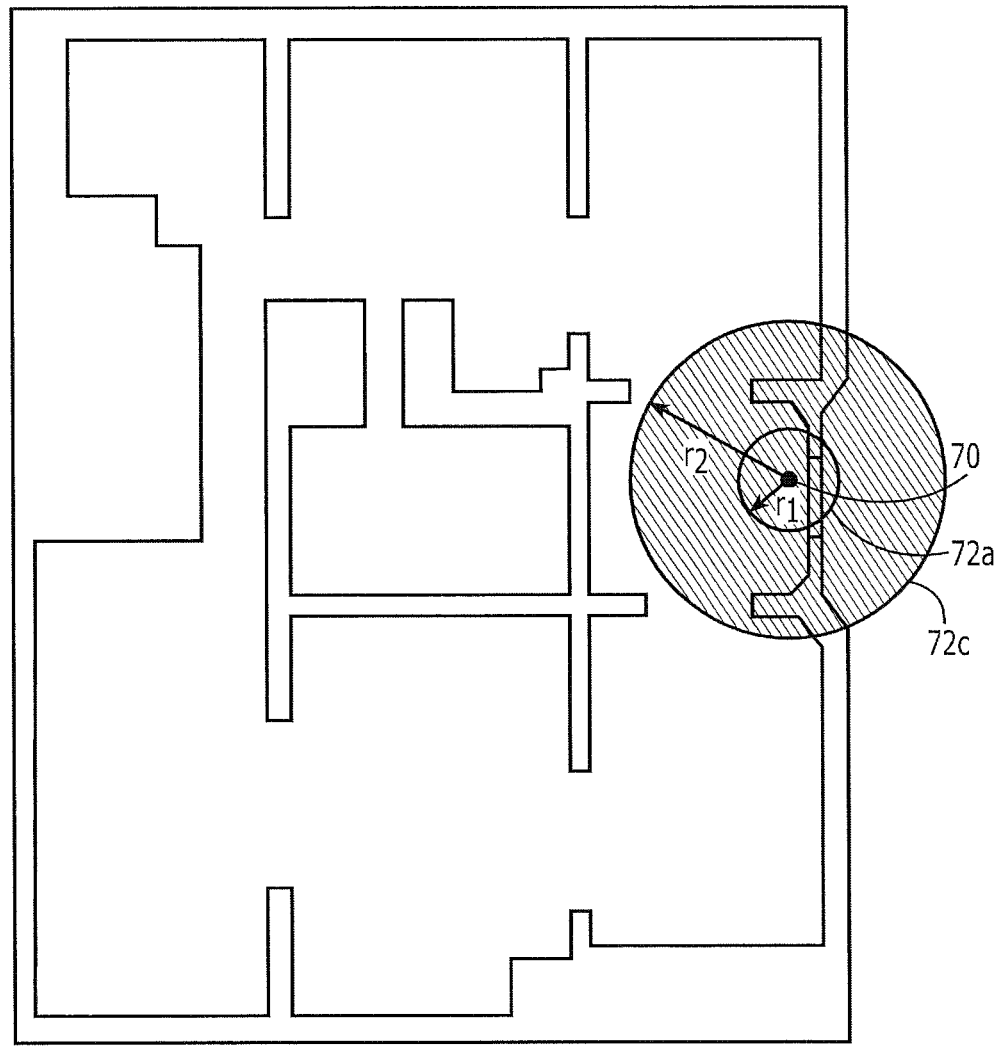
FIG. 8 is an illustration of a mapped space, location indication, and confidence circle proximate an exit of the space, with location delay and revised confidence circle, according to an embodiment of the present disclosure.

In order to reduce the effects of system jumping, and the consequent jumps in indicated location and confidence circle size, when a mobile device nears or is at a boundary between high precision and low precision positioning systems, the last known high precision (indoor) location is retained. This location is presented as the current device location while the accuracy radius grows in two phases. In a first phase, while it has not yet been determined (e.g., based on WiFi scans) whether the device has moved to an outside location or remains inside, the uncertainty radius is increased each time a step is taken. When a step has been taken may be determined from accelerometer, gyroscope, and/or magnometer data provided by the mobile device itself. This happens naturally and purposefully based on the re-weighting of the particles from step detection and the accuracy calculation. In the second phase, once it is certain that the mobile device has moved to an outside location, the confidence circle radius is increased by a certain amount per second (or other time measure) based on the calculated accuracy of the location indication. The transition period ends when a GPS signal is available and can provide better accuracy or after expiration of a timeout period for the transition (in which case the last known position may be retained or a new position assumed to be a transition position). The retained location is illustrated at point 70 in FIG. 8, with confidence circle 72a being the original confidence circle, which grows in radius to circle 72c.

Figure 9:
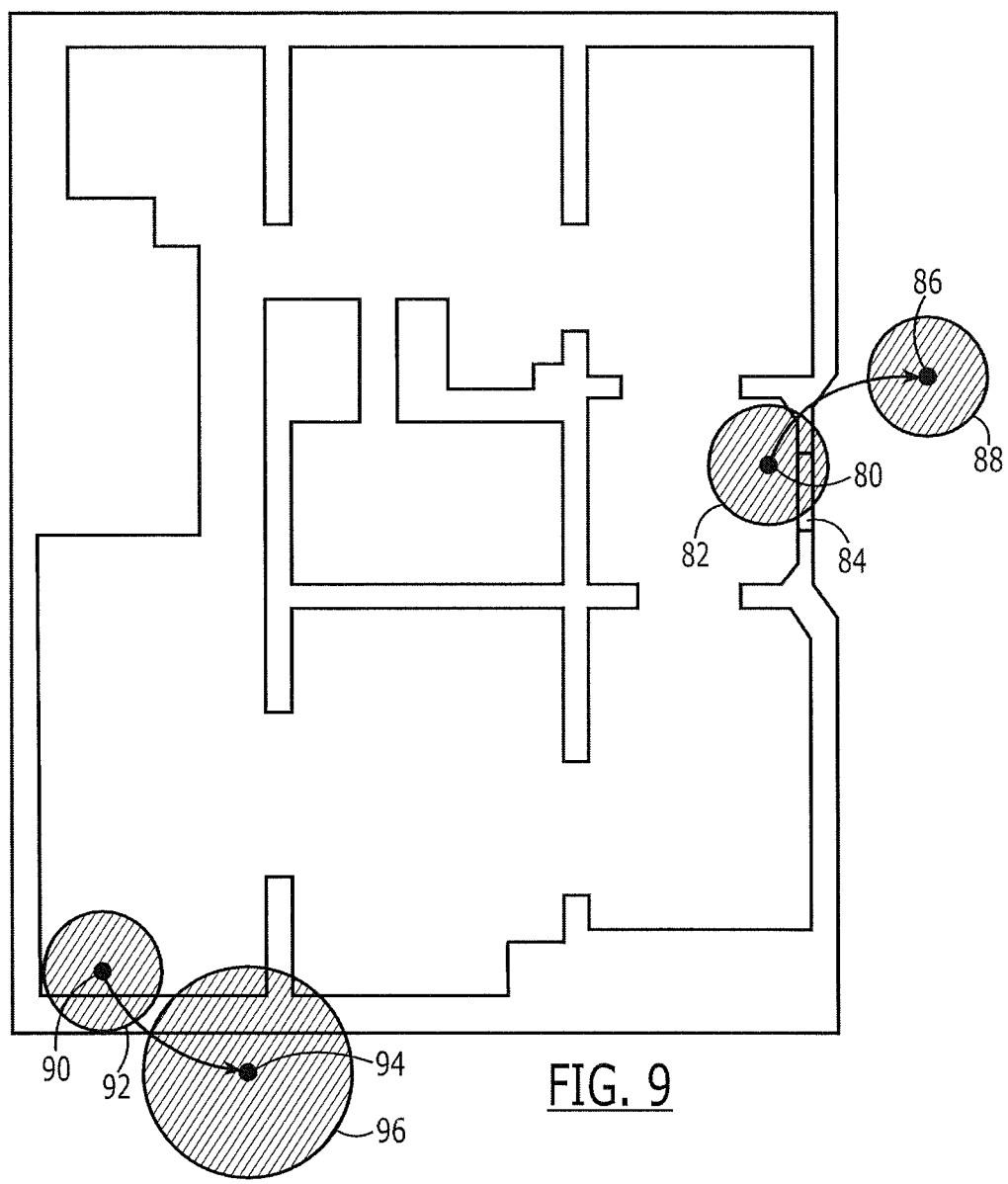
FIG. 9 is an illustration of a mapped space, several location indications and their associated confidence circles proximate the periphery of the mapped space, illustrating position control based on data regarding the structure such as wall and door locations, according to an embodiment of the present disclosure.

In addition to "smoothing" the transition from a first positioning system (e.g., indoors) to a second position system (e.g., outdoors), known attributes of the structure may be considered in determining whether to retain the position of the last known location and if so, for how long. FIG. 9 provides an illustration of this point. In a first instance, indicator 80 shows the location of a mobile device (and its confidence circle 82) proximate an exit 84 of the structure represented by map 66. It is therefore reasonable to permit indicator 80 to move from its current location to a location outside of the perimeter of map 66, such as position 86 (with confidence circle 88). However, in a second instance, indicator 90 shows the location of the mobile device (and its confidence circle 92) relatively far from an exit of the structure. Therefore, any data leading to an indication that the mobile device has moved directly outside of the perimeter of the structure, such as indicated by dot 95 and confidence circle 96 is suspect. This may result, for example, from the mobile device sensing location data from a lower-precision system.

There are a number of remedies for such a situation proposed herein. One such remedy is that there is a preference for the current state of the weighted mean particle (location indicator). For example, each particle may use position information and data regarding the space in which the mobile device is located to determine a state of "indoors", "outdoors", "on level x" (e.g., floor), "following vector y", and so on. The weight of a preference may be a function of the state. For example if the current location indicator has an "indoor" state, that preference may be strongly assumed (particularly if the current location indicator is not proximate an exit, as discussed below). Whereas an assumption regarding a vector may have a lower weighting (particularly if the current location indicator is proximate a path fork).

Another remedy for such a situation disclosed herein is the introduction of a delay in re-rendering the location indicator when such a re-rendering would put the indicator in an invalid state (e.g., across a barrier without an associated exit or portal, within a wall or partition, on another level or floor in the absence of stairs, elevator, escalator or the like, and so on).

Still another remedy for such a situation disclosed herein is to discard particles that tend toward an invalid state. For example, if a particle is across a barrier from the current weighted mean particle (location indicator), and there is no portal through which the mobile device can reasonably move, then that particle may be removed from consideration (or its weight significantly lowered).

Figure 10:
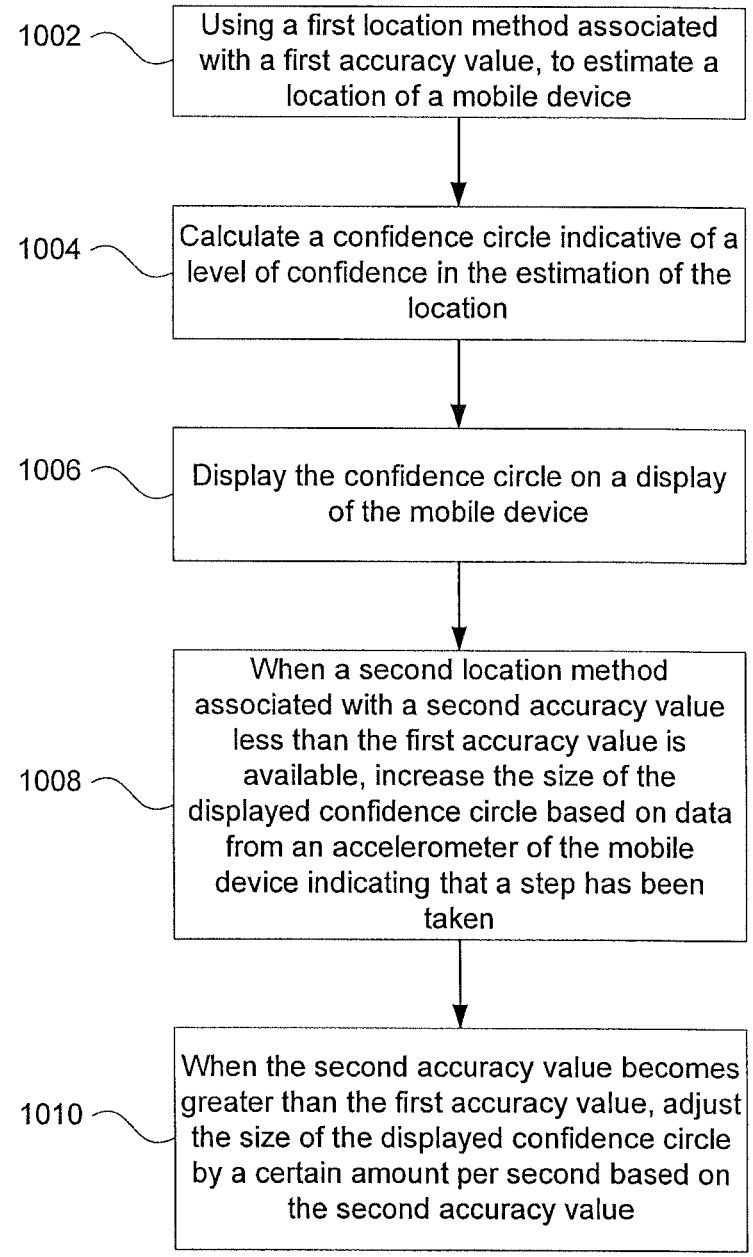
FIG. 10 is a flow diagram according to an embodiment of the present disclosure.

Flow diagram 1000 of FIG. 10 illustrates an example process including some of the features described above as performed by a processor of a mobile device. In this example, a first location method associated with a first accuracy value is used to estimate the location of a mobile device at block 1002. The accuracy value is indicative of how accurate an estimation may be made using the first location method at the time the estimation is made. A confidence circle, indicative of a level of confidence in the estimation of the location, is calculated at block 1004. This confidence circle is displayed on a display of the mobile device at block 1006. When a second location method associated with a second accuracy value less than the first accuracy value is available, the size of the displayed confidence circle is increased based on data from an accelerometer of the mobile device indicating that a step has been taken at block 1008. When the second accuracy value becomes greater than the first accuracy value, the size of the displayed confidence circle is adjusted by a certain amount per second based on the second accuracy value. Various of the other features described herein may also be incorporated into the process of flow diagram 1000. In addition, the blocks of the process may also be changed or removed.

Figure 11:
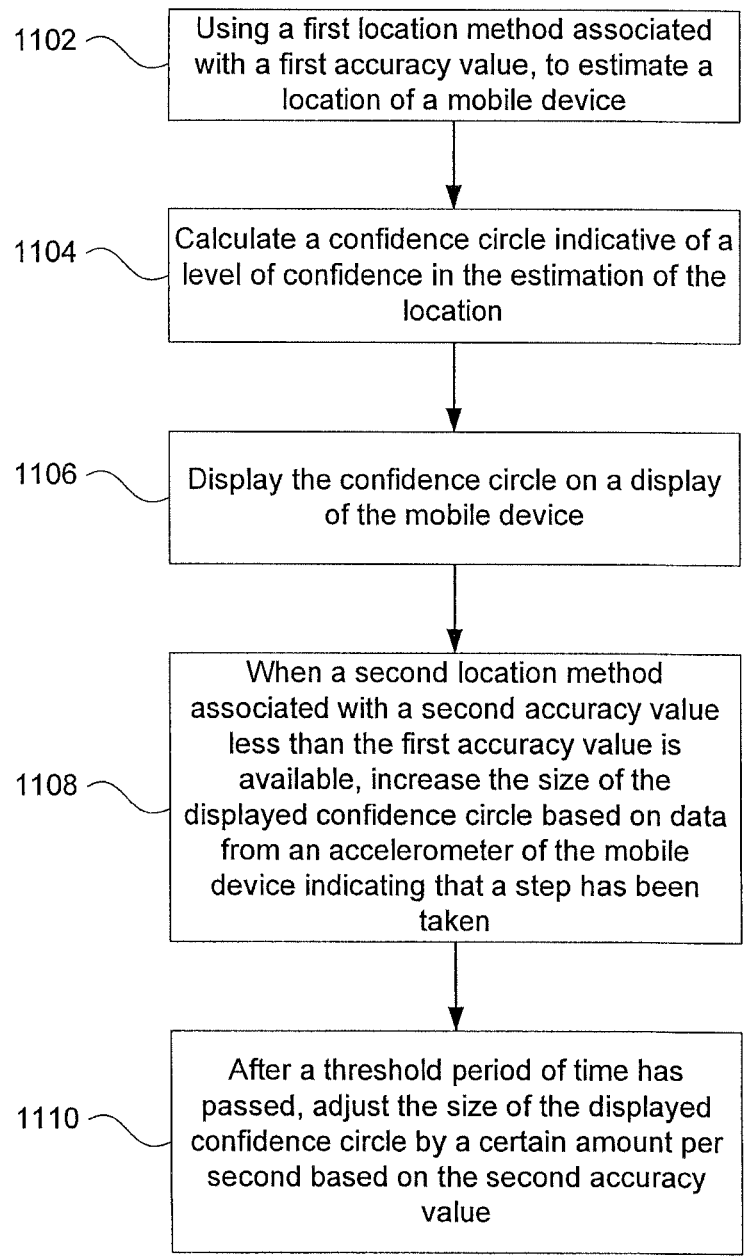
FIG. 11 is another flow diagram according to an embodiment of the present disclosure.

Flow diagram 1100 of FIG. 11 illustrates an example process including some of the features described above as performed by a processor of a mobile device. In this example, a first location method associated with a first accuracy value is used to estimate the location of a mobile device at block 1102. The accuracy value is indicative of how accurate an estimation may be made using the first location method at the time the estimation is made. A confidence circle, indicative of a level of confidence in the estimation of the location, is calculated at block 1104. This confidence circle is displayed on a display of the mobile device at block 1106. When a second location method associated with a second accuracy value less than the first accuracy value is available, the size of the displayed confidence circle is increased based on data from an accelerometer of the mobile device indicating that a step has been taken at block 1108. After a pre-determined period of time has passed, for example since the second location method has become available, the size of the displayed confidence circle is adjusted by a certain amount per second based on the second accuracy value. Various of the other features described herein may also be incorporated into the process of flow diagram 1100. In addition, the blocks of the process may also be changed or removed.

In the second phase described above, once it is certain that the mobile device has moved to an outside location, rather than increasing the confidence circle radius by a certain amount per second (or other time measure), a particle filter may be used to resolve the size of the accuracy circle. In this example, inputs to the filter may include how accurate the two location methods are, how much the location methods are trusted, the physics of motion (where was the previous location, time speed, inertial, etc. of the client device), etc. In this regard, the filter may be used not only to determine the location of the client device but also the size of the confidence circle.

While the examples described above relate generally to transitioning between an indoor location method such as WiFi and an outdoor positioning method such as GPS signals, various other location methods and transitions may also be used. For example, vision based localization (comparing images), cellular tower triangulation, user input locations, etc. may also be used. Similarly, depending upon the availability of signals, transitions between cellular and GPS methods, cellular and WiFi methods, etc. may also be used.

In still other examples, the features described herein may be used to adjust the size of a confidence circle based on transitions between modes of movement for the mobile device. For example, returning to the example of FIG. 6, if someone was standing still at the location of location dot, point 70, the mobile device may continue to display the point 70 in the same relative position despite any noise from the indoor location system (WiFi signals). When the modality of the mobile device changes, for example, if the person begins walking, even if the direction were unknown, the confidence circle may be expanded at an estimated or average walking pace. In this example, if an average walking speed is 0.3 m/s, the confidence circle 72 may be expanded at 0.3 m/s while the location dot remains stationary. This may continue until an additional location determination is made and the location dot is moved accordingly. The mobile device may detect this change in movement by using the accelerometer as a step detector, etc.

Similarly, if the mobile device detects that it has changed from a walking speed to a running speed from the accelerometer information, the rate at which the confidence circle expands may also be increased. In this example, if an average walking pace of a person is 0.5 m/s and an average running speed of a person is 1.0 m/s, then when transitioning from a walking mode to a running mode, if there were not additional location input, the location dot may remain stationary while the accuracy circle expands at a rate of 1.0 m/s instead of 0.5 m/s. Similarly, if data from a compass of the mobile device is available, the speed of the of the blue dot may be increased and it may be moved in a direction indicated by the data from the compass.

The embodiments described encompass embodiments in hardware, software, firmware, or a combination thereof. It will also be appreciated that the methods, in the form of instructions having a sequence, syntax, and content, of the present disclosure may be stored on (or equivalently, in) any of a wide variety of computer-readable media such as magnetic media, optical media, magneto-optical media, electronic media (e.g., solid state ROM or RAM), etc., the form of which media not limiting the scope of the present disclosure. A computer reading said media is operable to either transfer (e.g., download) said instructions thereto and then operate on those instructions, or cause said instructions to be read from the media and operate in response thereto. Furthermore, devices (e.g., a reader) for accessing the instructions on said media may be contained within or connected directly to the computer on which those instructions operate, or may be connected via a network or other communication pathway to said computer.

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the descriptions herein. Therefore, the foregoing description provides those of ordinary skill in the art with a convenient guide for implementation of the disclosure, and contemplates that various changes in the functions and arrangements of the described embodiments may be made without departing from the spirit and scope of this disclosure.

The invention claimed is:

1. A method comprising:
   estimating, by one or more processors, using a first location method, a current location of a mobile device based on a first accuracy value for the first location method;
   determining, by the one or more processors, a size of a first confidence circle indicative of a level of confidence in the location estimation based on the first accuracy value;
   providing for display, by the one or more processors, the first confidence circle according to the determined size and a location marker representing the current location such that the location marker is positioned at a relative location within the first confidence circle;
   when a second location method associated with a second accuracy value different from the first accuracy value is available, determining, by the one or more processors, an updated size of the first confidence circle by increasing a radius of the first confidence circle, wherein the second location method is different from the first location method; and
   providing for display, by the one or more processors, a second confidence circle according to the updated size of the first confidence circle such that the first confidence circle appears to increase to the size of the updated confidence circle while the location marker remains stationary.

2. The method of claim 1, further comprising after estimating the current location, determining that a step has been taken with the mobile device, and wherein determining the updated size of the first confidence circle is based on the determination that the step has been taken.

3. The method of claim 1, wherein the current location corresponds to an indoor location and updated size of the first confidence circle when it has not yet been determined that the mobile device has moved from the indoor location to an outdoor location.

4. The method of claim 1, wherein the current location corresponds to an indoor location, and the method further comprises:
   determining that the mobile device has moved from the indoor location to an outdoor location; after determining that the mobile device has moved to the outdoor location, determining an updated size of the second confidence circle by increasing a radius of the second confidence circle based on a confidence in the determination that the mobile device has moved to the outdoor location; and
   providing for display, by the one or more processors, the third confidence circle according to the updated size such that the second confidence circle appears to increase to the size of the updated second confidence circle while the location marker remains stationary while the location marker remains stationary.

5. The method of claim 4, wherein determining the updated size of the second confidence circle includes increasing the radius of the second confidence circle by a certain amount over a certain period of time.

6. The method of claim 1, further comprising providing for display a map with the first confidence circle and wherein the second confidence circle is provided for display such that the location marker remains fixed relative to the map.

7. The method of claim 6, further comprising delaying providing a new location marker for display, when the new location marker would put the location marker in an invalid state relative to the map.

8. The method of claim 1 wherein the first accuracy value indicates a greater level of accuracy in location determinations using the first location method than a level of accuracy in location determinations using the second location method according to the second accuracy value.

9. The method of claim 1, further comprising after a predetermined period of time after the current location is estimated, providing for display a new location for the location marker such that the location marker is moved to the new location.

10. A system comprising one or more processors configured to:
   estimate using a first location method, a current location of a mobile device based on a first accuracy value for the first location method;
   determine a size of a first confidence circle indicative of a level of confidence in the location estimation based on the first accuracy value;
   provide for display the first confidence circle according to the determined size and a location marker representing the current location such that the location marker is positioned at a relative location within the first confidence circle;
   when a second location method associated with a second accuracy value different from the first accuracy value is available, determine an updated size of the first confidence circle by increasing a radius of the first confidence circle, wherein the second location method is different from the first location method; and
   provide for display a second confidence circle according to the updated size of the first confidence circle such that the first confidence circle appears to increase to the size of the updated confidence circle while the location marker remains stationary.

11. The system of claim 10, wherein the one or more processors are further configured to after estimating the current location, determine that a step has been taken with the mobile device, and wherein determining the updated size of the first confidence circle is based on the determination that the step has been taken.

12. The system of claim 10, wherein the current location corresponds to an indoor location and updated size of the first confidence circle when it has not yet been determined that the mobile device has moved from the indoor location to an outdoor location.

13. The system of claim 10, wherein the current location corresponds to an indoor location and the one or more processors are further configured to:
   determine that the mobile device has moved from the indoor location to an outdoor location;
   after determining that the mobile device has moved to the outdoor location, determining an updated size of the second confidence circle by increasing a radius of the second confidence circle based on a confidence in the determination that the mobile device has moved to the outdoor location; and
   provide for display the third confidence circle according to the updated size such that the second confidence circle appears to increase to the size of the updated second confidence circle while the location marker remains stationary while the location marker remains stationary.

14. The system of claim 13, wherein determining the updated size of the second confidence circle includes increasing the radius of the second confidence circle by a certain amount over a certain period of time.

15. The system of claim 10, wherein the one or more processors are further configured to provide for display a map with the first confidence circle and wherein the second confidence circle is provided for display such that the location marker remains fixed relative to the map.

16. The system of claim 15, wherein the one or more processors are further configured to delay providing a new location marker for display, when the new location marker would put the location marker in an invalid state relative to the map.

17. The system of claim 10 wherein the first accuracy value indicates a greater level of accuracy in location determinations using the first location method than a level of accuracy in location determinations using the second location method according to the second accuracy value.

18. The system of claim 10, wherein the one or more processors are further configured to, after a predetermined period of time after the current location is estimated, provide for display a new location for the location marker such that the location marker is moved to the new location.

19. The system of claim 10, further comprising the mobile device, and wherein the one or more processors are one or more processors of the mobile device.

20. A non-transitory, computer readable medium on which instructions are stored, the instructions when executed by one or more processors, cause the one or more processors to perform a method, the method comprising:
   estimating using a first location method, a current location of a mobile device based on a first accuracy value for the first location method;
   determining a size of a first confidence circle indicative of a level of confidence in the location estimation based on the first accuracy value;
   providing for display the first confidence circle according to the determined size and a location marker representing the current location such that the location marker is positioned at a relative location within the first confidence circle;
   when a second location method associated with a second accuracy value different from the first accuracy value is available, determining an updated size of the first confidence circle by increasing a radius of the first confidence circle, wherein the second location method is different from the first location method; and
   providing for display a second confidence circle according to the updated size of the first confidence circle such that the first confidence circle appears to increase to the size of the updated confidence circle while the location marker remains stationary.

* * * * *